United States Patent [19]

Komorizono et al.

[11] Patent Number: 4,566,276
[45] Date of Patent: Jan. 28, 1986

[54] INLET ASSEMBLY FOR A BRAKE MASTER CYLINDER

[75] Inventors: Junichi Komorizono; Akihiko Miwa, both of Toyota, Japan

[73] Assignee: Aisin Seiki Kabushiki Kaisha, Kariya, Japan

[21] Appl. No.: 588,958

[22] Filed: Mar. 13, 1984

[30] Foreign Application Priority Data

Mar. 15, 1983 [JP] Japan ............................ 58-38242[U]

[51] Int. Cl.[4] .............................................. F15B 7/00
[52] U.S. Cl. ......................................... 60/585; 60/592
[58] Field of Search ................. 60/585, 592, 533, 581;
97/59; 285/61, 137 R

[56] References Cited

U.S. PATENT DOCUMENTS

| 3,479,068 | 11/1969 | Brittain | 60/585 |
| 3,914,943 | 10/1975 | Lewis | 60/585 |
| 3,937,020 | 2/1976 | Bierlein et al. | 60/592 |
| 4,337,792 | 7/1982 | Nomura | 60/592 |
| 4,489,556 | 12/1984 | Komorizono et al. | 60/585 |

FOREIGN PATENT DOCUMENTS

| 65891 | 12/1982 | European Pat. Off. | 60/585 |
| 148966 | 11/1979 | Japan | 60/585 |
| 4267 | 1/1980 | Japan | 60/585 |
| 11147 | 1/1982 | Japan | 60/533 |
| 26033 | 2/1982 | Japan | 60/585 |
| 521852 | 8/1976 | U.S.S.R. | 60/592 |

Primary Examiner—Abraham Hershkovitz
Assistant Examiner—Richard S. Meyer
Attorney, Agent, or Firm—Oblon, Fisher, Spivak, McClelland & Maier

[57] ABSTRACT

An inlet assembly for a brake master cylinder including an inlet member made of synthetic resin installed in the cylinder body of the master cylinder for connecting with a hose communicated with a reservoir installed in a vehicle body. The inlet member includes a first member integrally forming a first tubular portion on a cylinder body side of the inlet member which is fitted into an inlet portion of cylinder body, a second tubular portion for operative engagement with the hose, and a second member having a mounting portion for mounting on the cylinder body, the first member being integrally connected with said second member by heat welding or a similar form of connection.

6 Claims, 2 Drawing Figures

INLET ASSEMBLY FOR A BRAKE MASTER CYLINDER

BACKGROUND OF THE INVENTION

1. Field of the Invention

This invention relates generally to a brake master cylinder and more particularly to an inlet assembly for a brake master cylinder, the inlet member being installed in the body of the master cylinder for connecting the master cylinder with a hose which, in turn, is connected with a reservoir installed in a vehicle body.

2. Description of the Prior Art

In a conventional brake master cylinder of this type, an inlet member is integrally formed on the master cylinder by molding and consists of synthetic resin such as nylon in order to be both lighter in weight and lower in cost. The inlet member includes a tubular hose portion positioned in an inlet portion of the cylinder body for cooperation with a hose communicating with a reservoir and also includes a mounting portion for mounting the hose on the cylinder by screws or similar securing members. Therefore, in the situation in which the inlet member is installed in the cylinder body, the radial direction of the tubular portion for cooperating with the hose that is, in turn, connected with the reservoir is maintained constant. In case this brake master cylinder having an inlet member is to be installed in another automobile of a different type, the radial direction of the tubular portion may need to be different. Since this is not always possible in conventional assemblies, it is sometimes necessary to construct a completely new inlet member. As a result, many different types of inlet members need to be made available due to a lack of interchangeability of the inlet members for each type of cylinder body.

SUMMARY OF THE INVENTION

It is therefore an object of the present invention to avoid the aforementioned and other disadvantages of inlet members of conventional brake master cylinders.

More particulary, it is an object of the present invention to provide an improved brake master cylinder of the type wherein an interchangeable inlet member is installed in a cylinder body of the master cylinder.

It is another object of the present invention to provide a brake master cylinder wherein the radial direction of the tubular hose portion of the inlet member can be arbitrarily oriented with respect to the cylinder body.

According to the present invention, the inlet member comprises an integrally formed first member having a first tubular portion extending from a side of the cylinder body and a second tubular portion for cooperation with a hose and a second mounting member. The first member is connected with second member by heat welding or a similar method of connection. In the present invention, the radial direction of the tubular portion of the inlet member cooperating with the hose is arbitrarily established upon heat welding of the first and second members, and it is necessary to utilize a heat welding process or similar process. However, due to the fact that the first member and the second member are used in common, the resulting manufacturing costs are low in comparison with the construction of conventional assemblies, especially in situations where a small production of multiple inlet members only is required. Furthermore, there is an advantage in the present invention in that it is possible to quickly change the direction of the tubular portion for cooperation with the hose by simply changing the jig used in heat welding.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
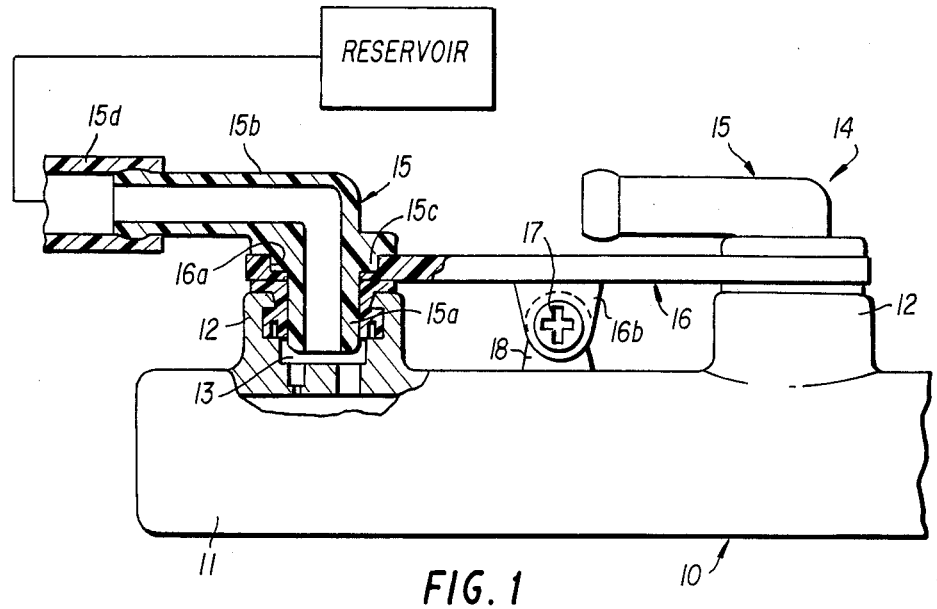
FIG. 1 is a partial cross-sectional view of brake member cylinder and inlet member in accordance with one embodiment of the present invention.

Referring now to the drawings and more particularly to FIG. 1 thereof, a tandem brake master cylinder 10 of the present invention comprises a cylinder body 11 which has two boss portions 12 in a top portion of body 11 and an inlet 13 formed in each boss portion for supplying brake fluid to each pressure chamber in the cylinder body 11. An inlet assembly 14 is comprised of two first members 15 which are formed by molding nylon and a second member 16 operatively connected with each first member 15 and which is also formed by molding nylon. Each first member 15 has a lower tubular portion 15a on the cylinder body side thereof hermetically fitted into the inlet 13, a side tubular portion 15b hermetically fitted into a connecting hose 15d in turn connected with a reservoir (not shown) and an intermediate large diameter portion 15c formed at upper outer peripheral portions of each first member.

The second member 16 has two holes 16a formed therein for heat welding connection with each first member 15 that is positioned respectively therein. More particularly, tubular portion 15a and the large diameter portion 15c are inserted into the holes 16a, 16a respectively from an upper direction in FIG. 1, and each first member 15 is integrally connected with second member 16 by means of heat welding, such as ultrasonic wave heat welding. The heat welding portion is the outer surface portion of large diameter portion 15c. The second member 16 also includes a projecting portion 16b which is removably mounted on a mounting portion 18 of cylinder body 11 by a screw 17 or similar securing mechanism.

Figure 2:
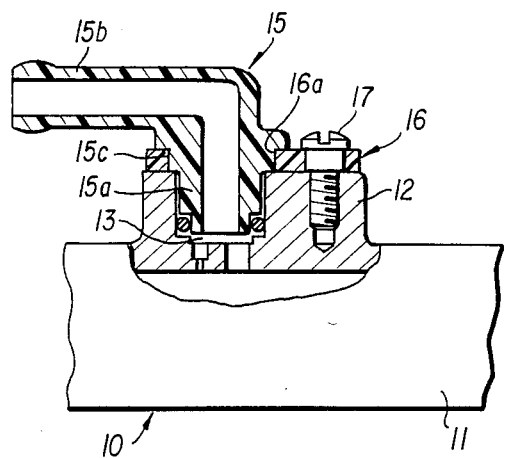
FIG. 2 is a partial cross-sectional view of brake master cylinder constructed in accordance with a second embodiment of the present invention.

In the second embodiment of the present invention shown in FIG. 2, the inlet assembly 14 comprises a single first member 15 and a second member 16. The second member 16 is mounted on the top portion of boss portion 12 by a screw 17.

Obviously many modifications and variations of the invention are possible in light of the above teachings. It is therefore to be understood that within the scope of the appended claims, the invention may be practiced otherwise than as specifically described herein.

What is claimed as new and desired to be secured by Letters Patent of the United States is:

1. A brake master cylinder having a reservoir, comprising:

a cylinder body having at least one inlet;

an inlet member mounted on said inlet of said cylinder body, said inlet member having at least one first member and a second member, said first and second members being formed of molded resin, respectively, and permanently interconnected with each other, said first member integrally forming a first tubular portion hermetically fitted into said inlet of said cylinder body and a second tubular portion connected to said first tubular portion, said second member having a mounting portion for mounting said inlet member on said cylinder body; and a hose hermetically connected to said second tubular portion of said first member and in communication with said reservoir wherein said cylinder body further comprises a boss portion extending therefrom and within which said first tubular portion is mounted, said second member having a hole formed therein at one end thereof within which said first tubular portion is positioned such that said one end of said second member is positioned between said second tubular portion and said boss portion; and means for positioning said second member above to a top portion of said boss portion.

2. A brake master cylinder having a reservoir, comprising:

a cylinder body having a pair of inlets;

an inlet member mounted on said pair of inlets of said cylinder body, said inlet member having a pair of first members and a second member, said pair of first members and said second member being formed of molded resin, respectfully, said second member permanently interconnecting said pair of first members, each of said first members integrally forming a first tubular portion hermetically fitted into a respective inlet of said cylinder body and a second tubular portion connected with said first tubular portion, and said second member having a mounting portion for mounting said inlet member on said cylinder body; and a pair of hoses hermetically connected to said second tubular portions, respectfully, of said first pair of member and in communication with said reservoir wherein said cylinder body further comprises a first and second boss portion extending therefrom and within which said first tubular portion of said pair of first members are respectfully positioned, said second member having a hole formed at opposite ends thereof and within which said pair of first members are respectively positioned such that said second member interconnects said pair of first members.

3. A brake master cylinder according to claim 1, wherein said first tubular portion further comprises a large diameter portion formed at an upper outer peripheral portion of said inlet member and which is positioned within said hole formed in said one end of said second member.

4. A brake master cylinder according to claim 2, wherein said first tubular portion further comprises a large diameter portion formed at an upper outer peripheral portion of said inlet member and which is positioned within said hole formed in said ends of said second member.

5. A brake master cylinder according to claim 1, further comprising heat welding means for permanently interconnecting said first member with said second member.

6. A brake master cylinder according to claim 2, further comprising heat welding means for permanently interconnecting said pair of first members with said second member.

* * * * *